Feb. 14, 1956    E. D. GOODALE    2,734,938

COLOR TELEVISION CAMERA

Filed Nov. 9, 1951    3 Sheets-Sheet 1

INVENTOR
Elmer Dudley Goodale
BY
Oliver & Mitchell
ATTORNEY

INVENTOR
Elmer Dudley Goodale
BY
ATTORNEY

INVENTOR
Elmer Dudley Goodale
BY Oliver A. Mitchell
ATTORNEY 2,734,938

COLOR TELEVISION CAMERA

Elmer Dudley Goodale, New Rochelle, N. Y., assignor to Radio Corporation of America, a corporation of Delaware Application November 9, 1951, Serial No. 255,715

11 Claims. (Cl. 178—5.4)

This invention relates to apparatus for generating separate electrical color signals corresponding to the variations in intensity of each of a plurality of primary colors as a scene is scanned in addition to a brightness signal corresponding to the combined intensities of each of the plurality of colors.

In most color television systems, each of the color signals has a bandwidth that is substantially equal to the bandwidth of the video transmission channel. Recently, however, a color television system has been developed in which the color signals are limited to less than the bandwidth of the video channel if a full band brightness signal is also available. The reduction in color detail is not objectionable, if not carried too far, because the eye is unable to detect details in color as well as it detects detail in brightness.

An object of this invention is to provide a color television pickup tube that provides separate color signals at one portion of the tube and a brightness signal at another portion of the tube.

Another object of the present invention is to provide improved apparatus whereby separate color signals of limited bandwidth are combined with brightness signals of full bandwidth so as to produce a composite color signal.

Briefly, the above objectives may be obtained by employing a special target in a tube using a low velocity scanning beam. In this type of tube a target is electrically charged in accordance with the brightness of the light striking it. A low velocity beam of constant intensity discharges the target as it scans over it and those electrons not required for the discharge of the target return to a collector. If different electrically segregated areas of the target are charged in in response to light of different primary colors from a scene, then the discharging action of the scanning beam produces a discharge current in each area proportionate to the intensity of the particular color light striking that area. Means are provided for conducting signals from areas struck by a given color light to a separate channel. If the areas are sufficiently small, the beam impinges on or encompasses a portion of each of the different color responsive areas and the total number of electrons extracted from the beam by the discharging action is proportional to the brightness of the scene and hence the portion of the beam returning to the collector provides brightness information. The color signals and the brightness signal are then combined so as to produce a composite color signal.

Another objective of this invention is to provide simultaneously color as well as black and white brightness signals from a single pickup tube. Other objectives of the invention are to provide a color television pickup system which is independent of scanning linearity, which provides color separation automatically, which requires a single lens system, which has for all practical purposes a single transfer characteristic, and no registration problems in the camera.

The manner in which the objectives and other advantages of the invention may be attained will be better understood from a detailed consideration of the drawings in which.

Figure 1:
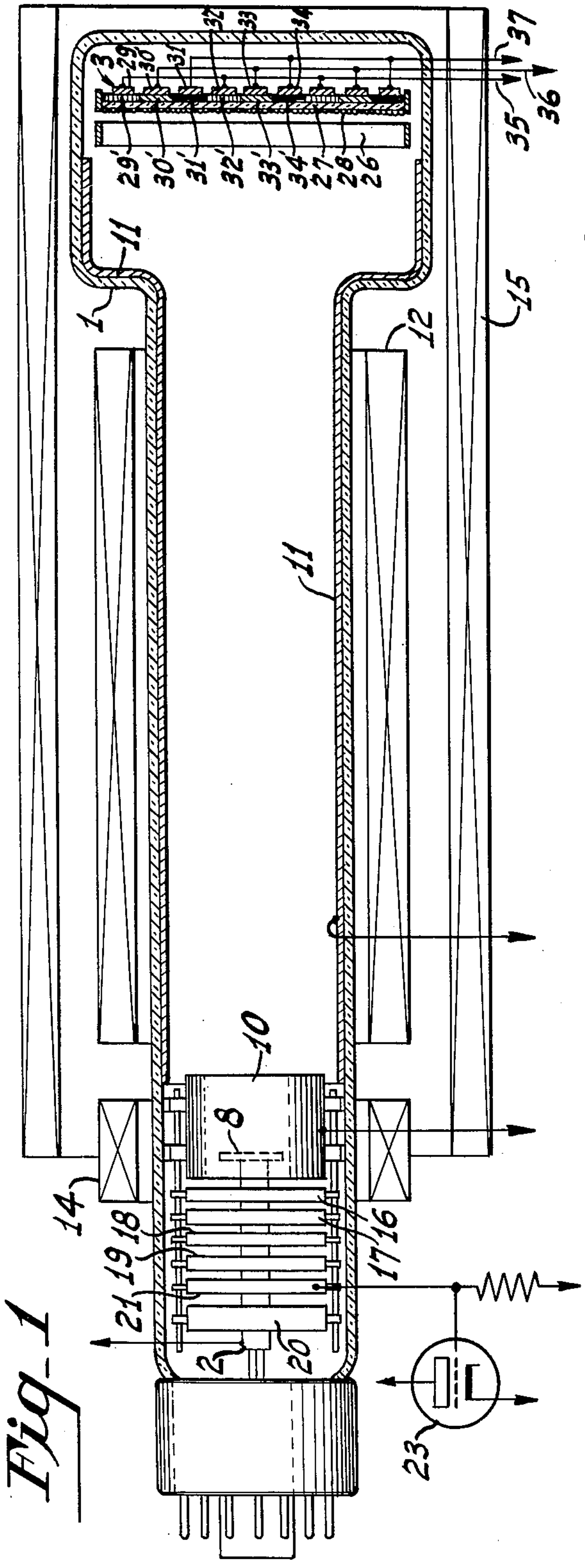
Figure 1 illustrates one form of cathode ray tube that may be employed in the practice of this invention.

Referring to Figure 1, the evacuated envelope 1 contains a gun 2 at one end thereof with a target or signal plate 3 at the other end. Tubular electrode 10 is axially placed around the front part of the gun and adjacent thereto. This is usually referred to as a "persuader" because its function is to direct the secondary electrons emitted by a first dynode 8 into the succeeding multiplier dynode, as will be hereinafter referred to. A wall coating 11 is applied to the inner wall of envelope 1 in known manner.

Outside the envelope 1 is placed the deflecting coil unit 12 having two electromagnetic coils with their field axes perpendicular to each other and to the longitudinal axis of the tube. One of these coils deflects the beam in a vertical direction and the other deflects it at right angles to the plane of the drawing. These coils are of well known construction and hence have not been individually shown. It will be understood that the deflection coils will have periodically varying voltages applied thereto, say by saw-tooth generators (not shown) of suitable frequencies, to produce line and frame scansion.

Outside of the envelope 1 is the compensating coil 14 having a field perpendicular to the axis of the tube. Coil 14 comprises two separate coils connected in series. These two coils are similar to those used in the deflecting yoke 12 and are of well known construction. The current passing through the two coils 14 will provide a magnetic field essentially in a plane perpendicular to the axis of the tube 1. By adjusting this coil circumferentially around the tube axis, certain types of undesired helical motion can be eliminated. Also, outside the coils 12 and 14 is placed coil 15, which produces a strong magnetic focusing field parallel to the axis of the tube on both sides of the target.

Around the gun are placed a plurality of additional multiplier dynodes 16, 17, 18 and 19 and 20 and a collecting electrode 21, which is a screen of suitable mesh. This collector electrode is connected to the desired utilization means by an amplifier tube 23. The dynodes 16, 17, 18 and 19 each consists of a disc of metal having angularity displaced radial blades somewhat like an electrical fan, held in a suitable annular frame and having a sufficient axial opening to pass in non-conducting relation over the electron gun 2.

The multiplier dynode 20 is the final multiplier stage and consists of a flat annulus spaced from and surrounding the electron gun. The multiplier dynodes, 16, 17, 18, 19 and 20 may be made of any metal having good electron-emitting properties, or may have a coating of active material to produce suitable emission of secondary electrons upon bombardment of primary electrons. The gun cathode is connected to ground. Adjacent the target 3 is arranged a decelerating ring 26, which is grounded to the electron gun cathode potential or thereabouts.

The target 3 may be similar to the target described in the U. S. Patent No. 2,446,249 to Schroeder. It may be comprised of a sheet of mica 27 having the beam side coated with a mosaic photoemitter 28. The particles of photoemissive material that form the mosaic are electrically segregated. Strips 29, 30, 31, 32, 33, 34 of transparent conducting material are mounted on the object side of the sheet of mica in registry with strips of color filters 29', 30', 31', 32', 33' etc. If the apparatus is to be employed in a color system having three primary colors, the color filter strip 29' may pass red light only, the filter strip 30' may pass blue light only, and the filter strip 31' may pass green light only. The sequence may then be repeated as many times as desired. The strips of color filter and transparent conductors can be oriented in any desired manner with respect to the scanning action of the beam. The position of the conducting strips and the color filter strips could be interchanged.

By such an arrangement the capacitance between the area of the photoemitter mosaic 28 in registry with an optical color filter and the corresponding conductive strip becomes charged in accordance with the intensity of the light passing through the optical color filter. When the low velocity beam of electrons scan the photoemitter mosaic 28, the capacitances are discharged by electrons from the beam. The conducting strips 29, 32, etc. that are in registry with the red filters 29', 32', etc. are connected to a common output lead 35. The conducting strips 30, 33, etc. that are in registry with the blue filter strips 30', 33' etc. are connected to a common output lead 36, and the conducting strips 31, 34, etc. opposite the green filters are connected to a lead 37. The remaining electrons of the beam then return to the first dynode 8 of the collector. If the strips are sufficiently small, the spot size of beam at the photoemitter mosaic 28 is large enough to straddle or encompass a part of the area of the photoemitter in registry with each of the three different color filter strips, and hence the number of electrons in the return beam depends upon the total of the charges developed in accordance with each of the three primary colors and therefore may be said to represent brightness.

Figure 2:
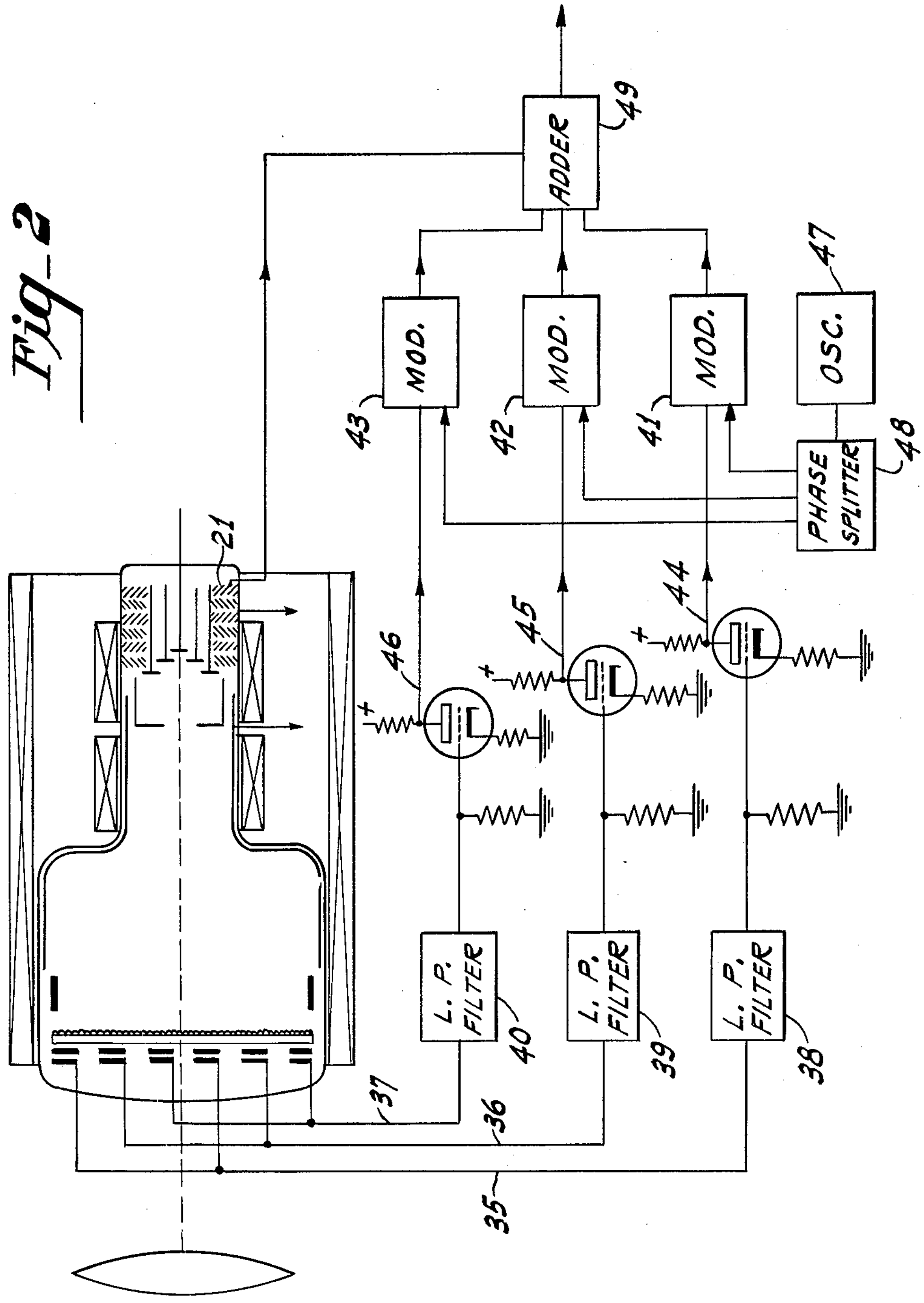
Figure 2 illustrates circuits that may be employed in combination with the tube of Figure 1 so as to produce a signal representing brightness and separate signals representing color.

The circuits employed to derive a composite color television signal representing brightness and color are illustrated in Figure 2. The leads 35, 36, and 37 are connected to low pass filters 38, 39 and 40 respectively. The upper frequency limit of the filters 38, 39 and 40 depends on the amount of color detail desired and the frequency at which intercoupling between the filter strips for the different colors becomes excessive. The color signals emerging from the low pass filters 38, 39 and 40 are coupled to modulators 41, 42 and 43 respectively via suitable narrow band amplifiers 44, 45 and 46. Different phases of the voltage waves of subcarrier frequency generated in an oscillator 47 are supplied to the modulators 41, 42 and 43 by a phase splitter 48. These differently phased waves of subcarrier frequency may be pulse or sine waves, but in either case they are amplitude modulated by the low frequency color signals. When the outputs of the modulators 41, 42 and 43 are combined in an adder 49 the resulting signal is a wave of subcarrier frequency, the amplitude and phase of which changes in accordance with the amplitudes of the low frequency color signals. The brightness signal derived at the collector is also applied to the adder 49 and therefore the signal at the output of the adder 49 is a composite signal of the desired type.

Figure 3:
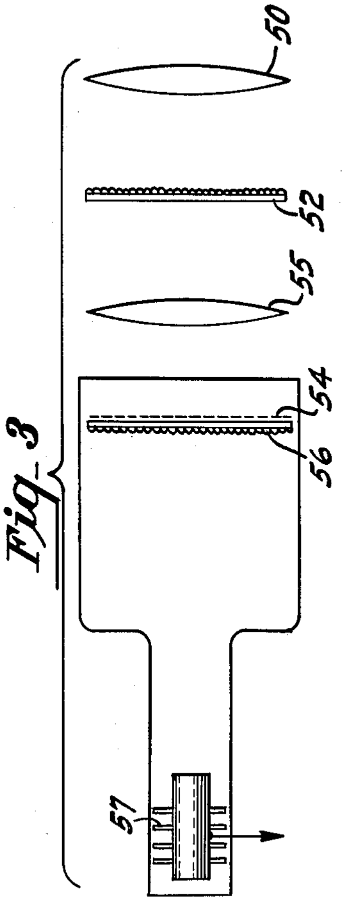
Figure 3 illustrates an optical system that may be employed in conjunction with a color television camera tube of the present invention.

Figure 3 illustrates another arrangement for splitting the light from the object into its primary colors. An object lens 50 serves to focus the object onto a color strip filter 52. Successive strips of the filter 52 are adapted to pass light of different primary colors. Light from those strips is focussed onto conducting target strips 54 by a lens 55 in such manner that light from each of the strips falls on a particular one of the target strips 54. The target strips 54 are partially transparent so that a lined charge pattern is built up on the photoemissive mosaic 56. Target strips receiving light from a particular color may be electrically coupled together as previously described so as to yield separate color signals. A collector 57 may be employed as before to extract brightness signals from the returning beam of electrons. In this arrangement, the optical color strip filter 52 may be larger than if it were built into the tube, and accordingly it may be easier to construct.

Figure 4:
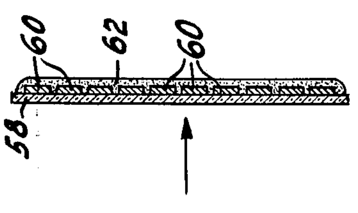
Figure 4 shows a different type of target that is useful in the apparatus of the invention.

Whereas this invention has been described in conjunction with low velocity scanning tubes employing photoemissive material, it is also applicable to tubes employing photoconductive materal. Figure 4 llustrates a target using photoconductive material that may be employed in the tubes previously discussed. A sheet of glass or mica 58 forms a supporting transparent structure onto which partially tarnsparent conducting strips 60 are mounted. The photoconductive material 62 may then be deposited over the strips 60 in a thin film. Light from the scene passes through an optical filter such as 52 of Figure 3, and the light of different colors passes through appropriate transparent strips 60 to the photoconducting layer 62. Thus when the low velocity beam scans the photo-conductor 62 currents flow in the strips 60 in proportion to the light falling on them. Strips receiving the same color light are connected together as before so that different color signals are provided by the strips. It would also be possible to place optical color filter strips in registry with the conducting strips 60 in a manner similar to that shown and described in connection with Figure 1.

Figure 5:
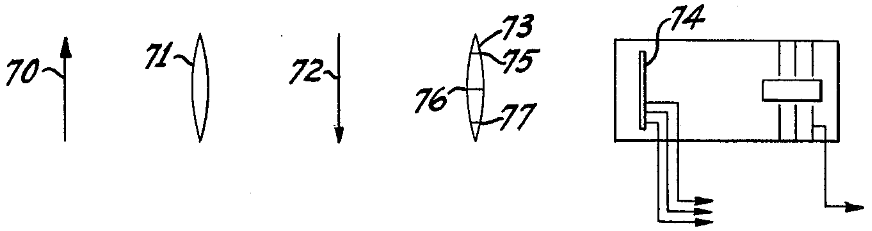
Figures 5 through 8 illustrate the application of the lenticular lens principle to the present invention.

Various arrangements may be employed for segregating the different selected component colors of light from the scene and for projecting them onto the different strip targets employed in the electron pickup tube. For example, the Figures 5 through 8 illustrate the manner in which a lenticulated lens may be employed to produce the desired color separation. In Figure 5 the object 70 is focused by an object lens 71 so as to form an image 72. The image 72 is relayed by a relay lens 73 to the target 74 on the pickup tube. The construction of the target will be discussed in connection with Figure 8. The initial color separation of the lenticular system is produced by using optical filters in conjunction with the relay lens 73. If the lenticules of the target 74 are to be parallel, then the portion of the relay lens 73 above the horizontal line 75 may be transmitting only blue light, the portion between the line 75 and the central axis 76 may transmit only red light, the portion between the line 76 and the line 77 may transmit only green light, and the portion below the line 77 may transmit only blue light. The arrangement of these optical filters as seen from the front of the relay lens 73 is illustrated in Figure 7.

Figure 8:
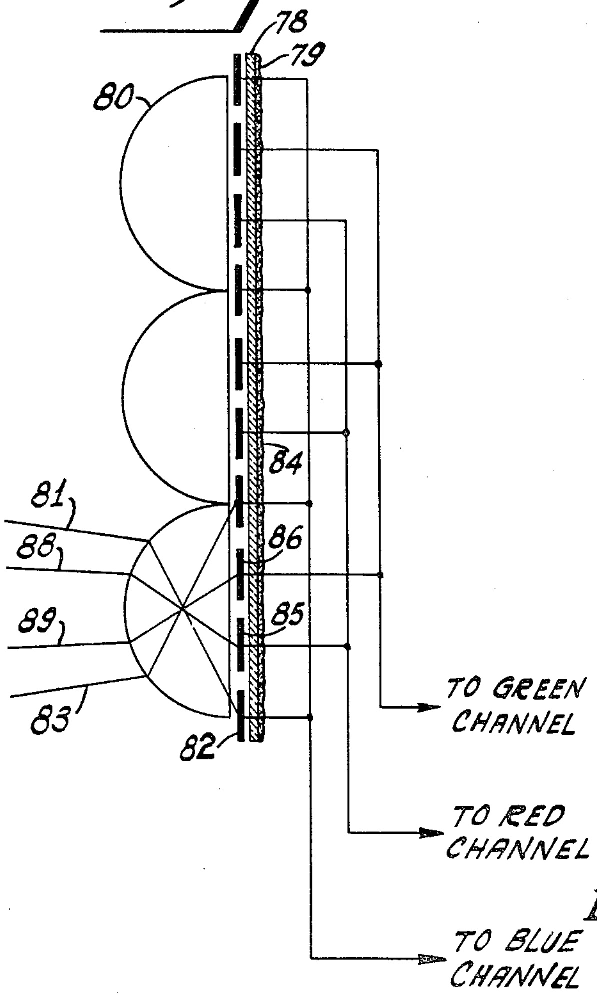

An enlarged view of the target 74 of the pickup tube is shown in Figure 8. The target is comprised of a series of horizontal parallel conducting strips. Every third strip is electrically connected to a different output channel. On the beam side of these target strips is placed an insulating layer 78 and on the beam side of the insulating layer 78 is placed a thin film 79 of either photoemissive or photoconducting material. On the object side of the target strips is placed a series of parallel transparent half cylinders 80. It will be noted that in this particular arrangement the half cylinders are aligned so that they begin at the mid point of one target strip and end at the mid point of a target strip that is connected to the same output channel. In either of the arrangements of Figure 5 or Figure 6, blue light passing through the top of the lens system outside of the pickup tube strikes lenticules along a path indicated by the numeral 81, and the lenticules are constructed of such material as to refract this blue light so that it strikes a strip 82 that is connected to the blue output channel. In a similar way, the blue light passing through the bottom section of the optical system follows a path 83 to the next target strip 84 that is connected to the blue output channel. It will be noted that the blue light following the paths 81 and 83 only impinges upon one half these corresponding target strips 82 and 84. In between the target strips 82 and 84 are similar target strips 85 and 86. The target strip 85 is connected to the red output channel. Light passing through the red section of the optical system that is between the horizontal lines 75 and 76 of the relay lens follows a path 88 to the target strip 85. In a similar manner, the green light that passes through the relay lens between the horizontal lines 76 and 77 follows a path 89 through the lenticular lens to the target strip 86.

Figure 6:
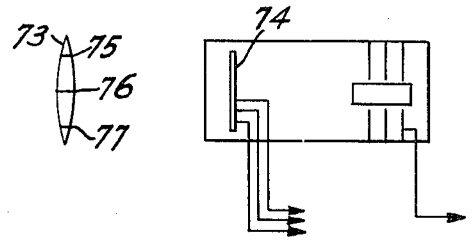
Figure 7:
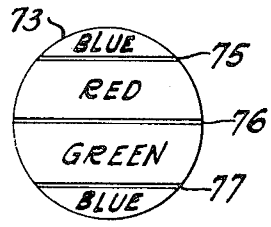

Figure 6 illustrates an arrangement whereby the color filters are associated with an objective lens and where a relay lens is dispensed with. However, it must be borne in mind that in such an arrangement there is a definite relationship between the focal lengths of the various lenticules or semi-cylindrical lenses 80 and the focal length of the objective lens. As in the case of Figure 5, the blue light may be transmitted by the portion of the object lens in Figure 6 lying above the horizontal line 75, and below the horizontal line 77. Red light is transmitted by the section of the lens between the axis 76 and the horizontal line 75, and green light is transmitted by the section of the lens between the axis 76 and the horizontal line 77. Light through these respective sections follows one or the other of the paths 81, 88, 89 and 83 to the appropriate target strips. In either of these arrangements, the effective cross sectional area of the beam may be equal to the diameter of one of the half cylindrical lenses so as to encompass at least three strips. In this way, those electrons that return from the target to a collector again produce a signal in the collector that represents the apparent brightness of the scene.

What is claimed is:

1. A color television pickup tube system comprising in combination an evacuated envelope, a target mounted in one end of said envelope, said target having a plurality of electrically segregated partially transparent current conducting strips, said strips being divided into different groups, the strips of one group being interleaved with the strips of another, the strips of each group being electrically connected together and to a respective output lead, a photo-responsive material coated on said target in such manner as to cause current flow in said output leads in proportion to the light falling on the respectively associated strips when the photo-responsive material is scanned by a beam of electrons, means for scanning said photo-responsive material with a low velocity beam of electrons, said beam of electrons having a cross sectional area sufficient to encompass at least one strip in each group, a collector adapted to gather electrons in said beam that return from said target, means for deriving from the currents appearing in said output leads respective component color signals, and means for separately deriving from the return beam electrons gathered by said collector a brightness signal.

2. A color television pickup tube system as described in claim 1 wherein the coating of photo-responsive material is a mosaic of photoemissive material, said mosaic being separated from said strips by a dielectric.

3. A color television pickup tube system as described in claim 1 wherein the coating of photo-responsive material is a photoconductive layer, said layer being in contact with said strips.

4. Apparatus for deriving different relatively narrow-band low frequency color signals and a relatively broad band brightness signal from a scene comprising in combination, a cathode ray tube, a dielectric sheet mounted in one end of said tube, one side of said sheet being coated with a mosaic of photoemissive material, means adapted to activate successive strip-like areas of said photoemissive mosaic with light of respectively different primary colors from said scene, an electron gun adapted to direct a beam of electrons toward said photoemissive mosaic, the width of any one of said strip-like areas times the number of primary colors being less than the diameter of the beam at said photoemissive mosaic, means for decelerating said electrons so that they arrive at said mosaic with nearly zero velocity, a collector for gathering electrons not taken from the beam by said mosaic, a strip of partially transparent conducting material mounted in registry with each of said strip-like areas on the side of said dielectric sheet remote from the photoemissive mosaic, the strips having the same color light directed to them being connected together and in common to a respective output lead, means for deriving a respectively different one of said narrow band low fequency color signals from each of said output leads, and means for separately deriving said broad band brightness signal from said collector.

5. Apparatus for generating color television signals including low frequency color signals and a full band brightness signal comprising in combination a cathode ray tube, a target in said cathode ray tube having a plurality of groups of interleaved partially transparent electrically conducting strips, optical means for directing light of a different primary color from a scene to a selected group of strips, photo-responsive material mounted on said target in such a way that current flows to said strips in an amount dependent on the intensity of light falling thereupon when scanned by low velocity beam of electrons, means for scanning said photo-responsive material with a low velocity beam of electrons, a collector adapted to receive electrons in said beam that are not absorbed by said photo-responsive material, a different low pass filter coupled to each group of strips, an oscillator, a phase splitter coupled to the output of said oscillator, a modulator coupled to each differently phased output of said phase splitter, the outputs of each low pass filter being coupled to a different one of said modulators, and an adder coupled to the output of said modulators and to said collector.

6. Apparatus for generating color television signals including low frequency color signals and a full bandwidth brightness signal comprising a pickup tube system as described in claim 1, a different low pass filter adapted to receive each of said component color signals, a separate modulator coupled to the output of each filter, means for supplying each modulator with a different phase of a given frequency, and an adder for combining the outputs of said modulators with the brightness signal derived from the return beam electrons gathered by said collector.

7. A color television camera comprising a color pickup device including means for developing a low velocity scanning beam of electrons, a target structure for said scanning beam including a plurality of interleaved sets of conducting strips, and a collector for electrons of said beam returning from said target, means for deriving respective component color signals from said strip sets, and means for separately deriving a brightness signal from said collector.

8. A color television camera comprising the combination of a single cathode ray tube color television pickup device, said cathode ray tube being of the type including an electron target structure comprising a plurality of interleaved sets of conducting strips for deriving respective component color signals and also including a collector for electrons returned from said target structure, means for separately deriving a relatively broad band brightness signal from the electrons returned from said target to said collector, means for utilizing said component color signals and said brightness signal in the formation of a composite color picture signal, and a plurality of low pass filters having relatively narrow passbands, each of said filters being coupled between a respectively different one of said strip sets and said signal utilization means whereby only a relatively narrow band low frequency portion of each of said component color signals derived from said target structure is utilized by said latter means.

9. A color television camera comprising a pickup tube of the type employing a low velocity scanning beam of electrons, means for deriving a plurality of component color signals from said tube, and means for separately deriving a brightness signal from said tube, said component color signal deriving means comprising a photo-responsive, color selective, segmented electron target structure of the type including a plurality of respective component color responsive groups of interleaved signal strips, and said brightness signal deriving means comprising means for simultaneously collecting electrons returned from the vicinity of a plurality of said strips, said plurality including at least one strip of each of said groups.

10. A color television camera in accordance with claim 9 including low pass filter means coupled to each of said strip groups for passing only a low frequency portion of signals derived by each of said strip groups, and means for utilizing said low frequency portions and said brightness signal in the formation of a composite color picture signal.

11. Color television pickup apparatus comprising in combination an evacuated envelope, a sheet of dielectric mounted in said envelope, said sheet having electrically segregated partially transparent current conducting strips mounted on the object side, said strips being divided into different groups, the strips of each group being electrically connected together to a respective output lead, and the strips of each group being interleaved with the other strips, a mosaic of material adapted to develop a charge distribution corresponding to the intensity of light falling on it, said mosaic being mounted on the opposite side of said sheet, means for rendering the portions of said mosaic in registry with the strips of each group responsive only to light from said object of a respectively different component color, means for scanning said mosaic with a low velocity beam of electrons, said beam of electrons having a cross-sectional area sufficient to encompass a mosaic area including at least one portion responsive to light of each of said component colors, a collector adapted to receive the electrons of said beam that return from said target, component color signal utilization means coupled to said output leads, and brightness signal utilization means coupled to said collector.

References Cited in the file of this patent

UNITED STATES PATENTS

| | | |
|---|---|---|
| 2,446,249 | Schroeder | Aug. 3, 1948 |
| 2,446,791 | Schroeder | Aug. 10, 1948 |
| 2,479,820 | De Vore | Aug. 23, 1949 |
| 2,554,693 | Bedford | May 29, 1951 |
| 2,586,482 | Rose | Feb. 19, 1952 |

FOREIGN PATENTS

| | | |
|---|---|---|
| 975,198 | France | Mar. 2, 1951 |